2,816,042
Patented Dec. 10, 1957

2,816,042
REFRACTORY ARTICLE AND PROCESS OF MANUFACTURING SAME

Noble E. Hamilton, Ames, Iowa, assignor to the United States of America as represented by the United States Atomic Energy Commission No Drawing. Application June 27, 1947,
Serial No. 757,689

20 Claims. (Cl. 106—55)

This invention relates to shaped refractory masses consisting largely of uranium dioxide and to methods of preparing the same.

In order that a ceramic body be sufficiently refractory for melting uranium metal, it has to withstand temperatures of about 1125° C. to about 2100° C. An additional requirement of refractories is that it be chemically inert toward the uranium metal so as not to contaminate the product, or if reactive, that the contaminant added be harmless or one that can be removed in the next step, such as a volatile metal that can be distilled out by melting in vacuo. The refractory must be mechanically strong and resistant to thermal shock or heat.

Due to its relatively high heat of formation and its relatively high melting point, uranium oxide is a suitably inert refractory for melting uranium. Moreover, uranium oxide can be obtained in quantity in relatively high purity.

In the fabrication of a refractory article for making metal fusions of uranium, it was found that the conventional methods of making a refractory article of uranium oxide were not satisfactory. The article formed of pure uranium oxide did not possess good mechanical strength due to poor cohesion of the uranium oxide.

An object of this invention relates to the fabrication of a uranium oxide refractory article for melting uranium metal.

Further objects of the present invention will be apparent from the following description.

In making fusions of uranium metal, which has a melting point of about 1125° C., it is necessary to have a refractory container of unusual stability so that it will retain its form and there will be little or no reaction or alloying between the molten uranium metal and the refractory.

These refractories may be used as linings for reaction chambers, crucibles for making metal fusions, casting molds, insulation and thermocouple shields, and other heat-resistant bodies.

The present invention is directed toward novel refractory compositions of uranium oxide and certain other refractory oxides. Uranium dioxide ($UO_2$) is considered the preferred refractory uranium oxide for forming a shaped refractory mass, although other uranium oxides, such as $U_3O_8$, have been found satisfactory.

In accordance with the present invention, it has been found that uranium oxide admixed with specific other refractory oxide binders, such as beryllium oxide, magnesium oxide, aluminum oxide, calcium oxide, tantalum oxide, thorium oxide, and titanium oxide, in varying proportions, will form a refractory article suitable for making metal fusions of uranium metal. In addition, the methods of preparing these combined uranium oxide refractories are also deemed novel.

The refractory oxide binder may be present in the shaped refractory article in a quantity as high as 90 percent by weight, or higher, of the composition containing the uranium oxide and oxide binder. However, preferably the binder oxide is present in an amount substantially less than the amount of uranium oxide. Particularly satisfactory results have been obtained when the uranium oxide is present in an amount from about 90 to 95 percent by weight and the binder oxide in an amount from about 10 to 5 percent by weight.

In the fabrication of a refractory article, such as a crucible, the method of forming a body is to jolt or tamp the refractory composition into the annular space between a concentrically placed mandrel and a suitable outer form. In this dry method of forming a body, it is important that there be sufficient mechanical cohesion of the uranium oxide refractory; the use of the above-mentioned refractory oxides as binders has given advantageous results.

A specific embodiment of this invention employs beryllium oxide with uranium oxide. While the composition of uranium oxide and beryllium oxide has been varied from about 90 percent by weight to 5 percent by weight of beryllium oxide with corresponding percentage differences of uranium oxide, the refractory composition of uranium oxide and beryllium oxide considered most satisfactory for making a refractory contained approximately from 90 to 95 percent by weight of uranium oxide and from 10 to 5 percent by weight of beryllium oxide. The specific refractory composition of uranium oxide and beryllium oxide was then thoroughly mixed and dry-pressed into a shaped refractory article, such as a crucible. Crucibles of such compositions were fired at an elevated temperature in the range from about 1400° C. to 2000° C. in a non-oxidizing atmosphere to form a sintered, shaped refractory article. A sintering temperature of about 1600° C. and an atmosphere of hydrogen gas proved to be the most satisfactory condition. Similar results may be obtained by using an inert atmosphere, such as helium, or by heating the refractory article in vacuo.

Magnesium oxide was admixed with uranium oxide in proportions varying between 5 and 10 percent by weight of magnesium oxide with 95 to 90 percent by weight of uranium oxide. The refractory composition was then dry-pressed into a suitable refractory article and fired and sintered in a non-oxidizing atmosphere, such as hydrogen gas, at an elevated temperature in the range between 1400° C. and 2000° C.

Crucibles of beryllium oxide-uranium oxide and magnesium oxide-uranium oxide exhibited high mechanical strength, low porosity, and were quite resistant to thermal shock. Crucibles of purified uranium oxide-magnesium oxide and uranium oxide-beryllium oxide were quite satisfactory from a standpoint of noncontamination by elements other than oxygen. These crucibles displayed no appreciable defects after having held molten uranium metal for a period of about one hour at a temperature above 1400° C.

In another embodiment of this invention, a refractory article of uranium oxide and thorium oxide was compressed into a shaped mass, and then fired at a temperature of about 1900° C. in an atmosphere of hydrogen gas, producing a well sintered crucible with very smooth surfaces. It was found that a refractory composition of about 50 percent by weight of thorium oxide and 50 percent by weight of uranium oxide produced the most satisfactory refractory under these conditions. In a similar manner, tantalum oxide ($Ta_2O_5$) was admixed with uranium oxide in a 1:1 proportion by weight, and the mixture was fired at a temperature of about 1900° C. in an atmosphere of hydrogen gas; it also produced a refractory composition having relatively good mechanical strength.

Aluminum oxide combined with uranium oxide formed a refractory article exhibiting appreciable inertness toward molten uranium metal. It was found that about 5 percent by weight of aluminum oxide and 95 percent by weight of uranium oxide gave the most satisfactory refractory composition when fired at a temperature of about 1900° C. in an atmosphere of hydrogen gas.

Calcium oxide in similar proportions produced a refractory composition under corresponding conditions.

Refractory bodies produced by admixing 90 percent by weight of uranium dioxide and 10 percent by weight of beryllium oxide and then compressing the refractory oxide mixture into various shapes was considered to be the preferred composition for melting uranium metal. Compositions of uranium oxide and beryllium oxide were fabricated into various shapes ranging from about 2 inches to 7 inches in diameter and 3 inches to 12 inches tall. It was found that by admixing the refractory oxides of uranium oxide and beryllium oxide with a small percentage of calcium nitrate solution, which acted as an additional binder, satisfactory refractory bodies were also obtained.

It shall be noted that the present invention is directed toward the composition and fabrication of uranium dioxide refractory bodies which afford means for producing uranium metal fusions of extremely high purity. It was found that uranium oxide did not form shaped refractory articles when dry-pressed alone; but when certain other refractory oxides in specific proportions were added to uranium oxide, a refractory article having excellent mechanical strength and low contamination was obtained.

It will be apparent to those skilled in the art that various modifications can be made without departing from the principles of the invention as disclosed herein, and for this reason it is not intended that the invention shall be limited other than by the scope of the appended claims.

What is claimed is:

1. A refractory article of manufacture comprising a refractory composition of a uranium oxide selected from the group consisting of $UO_2$ and $U_3O_8$ and at least one refractory metal oxide selected from the group consisting of beryllium oxide, magnesium oxide, aluminum oxide, calcium oxide, tantalum oxide, thorium oxide, and titanium oxide.

2. A refractory article of manufacture comprising a uranium oxide and beryllium oxide containing from about 95 percent by weight to about 10 percent by weight of uranium dioxide and from about 5 percent by weight to 90 percent by weight of beryllium oxide.

3. A sintered refractory article of manufacture comprising a refractory composition of about 90 to 95 percent by weight of uranium dioxide and 10 percent to 5 percent by weight beryllium oxide.

4. A sintered article of manufacture comprising a refractory composition of about 90 percent by weight uranium dioxide and 10 percent by weight beryllium oxide.

5. A method of producing a shaped sintered refractory article which comprises admixing and compressing a uranium oxide selected from the group consisting of $UO_2$ and $U_3O_8$ and at least one refractory metal oxide selected from the group consisting of beryllium oxide, magnesium oxide, aluminum oxide, calcium oxide, tantalum oxide, thorium oxide, and titanium oxide into a shaped composite mass, and then sintering said composite mass at elevated temperatures in a non-oxidizing atmosphere.

6. A method of producing a shaped sintered refractory composition which comprises admixing and compressing a uranium oxide selected from the group consisting of $UO_2$ and $U_3O_8$ and at least one refractory metal oxide selected from the group consisting of beryllium oxide, magnesium oxide, aluminum oxide, calcium oxide, tantalum oxide, thorium oxide, and titanium oxide into a shaped composite mass, and then sintering said composite mass at a temperature in the range from about 1400° C. to 2000° C. in a non-oxidizing atmosphere.

7. A method of producing a shaped sintered refractory composition which comprises admixing and compressing powdered uranium oxide and beryllium oxide into a shaped powdered composite mass, and then sintering said composite mass at a temperature in the range from about 1400° C. to 2000° C. in a nonoxidizing atmosphere.

8. A method of producing a shaped sintered refractory composition which comprises admixing and compressing 90 percent by weight of powdered uranium dioxide and 10 percent by weight of beryllium oxide into a shaped composite mass, and then heating said composite mass to a sintering temperature of about 1600° C. in a non-oxidizing atmosphere whereby a refractory article having a uniform composition is obtained.

9. A method of producing a shaped sintered refractory composition which comprises admixing and compressing 90 percent by weight of powdered uranium dioxide and 10 percent by weight of beryllium oxide into a shaped composite mass, and then heating said composite mass to a sintering temperature of about 1600° C. in the presence of hydrogen atmosphere whereby a refractory article having a uniform composition is obtained.

10. A sintered refractory article of manufacture comprising a refractory composition of about 95 percent by weight of a uranium oxide selected from the group consisting of $UO_2$ and $U_3O_8$ and about 5 percent by weight of magnesium oxide.

11. A method of producing a shaped sintered refractory composition which comprises admixing and compressing about 95 percent by weight of powdered uranium dioxide and about 5 percent of magnesium oxide into a shaped composite mass, and then heating said composite mass to a sintering temperature of about 1900° C. in an atmosphere of hydrogen gas.

12. A sintered refractory article of manufacture comprising a refractory composition of about 50 percent by weight of uranium dioxide and about 50 percent by weight of thorium oxide.

13. A method of producing a shaped sintered refractory composition which comprises admixing and compressing about 50 percent by weight of uranium dioxide and about 50 percent by weight of thorium oxide into a composite mass, and then heating said composite mass to a sintering temperature of about 1900° C. in an atmosphere of hydrogen gas.

14. A sintered refractory article of manufacture, comprising about 95% by weight of uranium dioxide and 5% by weight of calcium oxide.

15. A sintered refractory article of manufacture, comprising about 90% by weight of uranium dioxide and about 10% by weight of a mixture of beryllium oxide and calcium oxide.

16. A sintered refractory article of manufacture, comprising 90 to 95% by weight of uranium dioxide and from 5 to 10% by weight of a mixture of beryllium oxide and magnesium oxide.

17. A method of producing a shaped, sintered refractory composition, which comprises admixing and compressing about 90% by weight of uranium dioxide, 10% by weight of beryllium oxide and a small quantity of aqueous calcium nitrate solution into a shaped, composite mass, and then heating said composite mass at a sintering temperature of about 1600° C. in an atmosphere of hydrogen gas.

18. A refractory article of manufacture comprising a uranium oxide selected from the group consisting of $UO_2$ and $U_3O_8$ and aluminum oxide containing from about 90 to 95 percent by weight of said uranium oxide and from about 5 to 10 percent by weight aluminum oxide.

19. A sintered refractory article of manufacture comprising a refractory composition of about 95% by weight of a uranium oxide selected from the group consisting of $UO_2$ and $U_3O_8$ and about 5% by weight of aluminum oxide.

20. A method of producing a shaped, sintered refractory composition, which comprises admixing and compressing about 95 percent by weight of a powdered uranium oxide selected from the group consisting of uranium dioxide and $U_3O_8$ and about 5 percent by weight aluminum oxide into a shaped composite mass, and then sintering said composite mass at a temperature from about 1400° C. to 2000° C. in a non-oxidizing atmosphere.

References Cited in the file of this patent

UNITED STATES PATENTS 2,434,236  Verwey et al. _____ Jan. 6, 1948

OTHER REFERENCES

Friend: Textbook of Inorganic Chemistry, vol. VII, part III, pp. 308 and 309. Published in 1926 by Charles Griffin and Co., Ltd., London.